United States Patent
Thompson Jr. et al.

(10) Patent No.: US 6,988,367 B2
(45) Date of Patent: Jan. 24, 2006

(54) GAS TURBINE ENGINE COOLING SYSTEM AND METHOD

(75) Inventors: Robert S. Thompson Jr., White Lake, MI (US); Gregg Williams, Bloomfield Hills, MI (US)

(73) Assignee: Williams International Co. L.L.C., Walled Lake, MI (US)

( * ) Notice: Subject to any disclaimer, the term of this patent is extended or adjusted under 35 U.S.C. 154(b) by 4 days.

(21) Appl. No.: 10/709,199

(22) Filed: Apr. 20, 2004

(65) Prior Publication Data

US 2005/0229601 A1    Oct. 20, 2005

(51) Int. Cl.
*F02C 7/12* (2006.01)

(52) U.S. Cl. .............. 60/772; 60/806; 60/744
(58) Field of Classification Search .......... 60/772, 60/806, 744; 415/115, 96 R, 97 R
See application file for complete search history.

(56) References Cited

U.S. PATENT DOCUMENTS

| | | | |
|---|---|---|---|
| 2,647,368 A | 8/1953 | Treibbnigg et al. ............ 60/775 |
| 2,783,613 A | 3/1957 | Von Zborowski ............. 60/736 |
| 2,849,210 A | 8/1958 | Turunen et al. ............ 416/96 R |
| 2,866,313 A | 12/1958 | Holl ............................. 60/261 |
| 2,883,151 A | 4/1959 | Dolida ..................... 416/96 R |
| 2,945,671 A | 7/1960 | Petrie .......................... 415/115 |
| 3,355,883 A | 12/1967 | Beam ....................... 60/39.511 |
| 3,550,372 A * | 12/1970 | Morton ........................ 60/779 |
| 3,600,890 A | 8/1971 | White et al. ................... 60/736 |
| 3,734,639 A | 5/1973 | Short ......................... 415/114 |
| 3,756,020 A | 9/1973 | Moskowitz et al. ........... 60/760 |
| 3,902,819 A | 9/1975 | Holchendler et al. .......... 416/1 |
| 4,134,709 A | 1/1979 | Eskesen ......................... 416/1 |
| 4,156,582 A | 5/1979 | Anderson ................. 416/96 R |
| 4,179,240 A | 12/1979 | Kothmann ................ 416/96 R |
| 4,190,398 A | 2/1980 | Corsmeier et al. .......... 415/114 |
| 4,259,037 A | 3/1981 | Anderson ................. 416/96 R |
| 4,260,336 A | 4/1981 | Johnson .................... 416/96 R |
| 4,338,780 A | 7/1982 | Sakamoto et al. ............ 60/775 |
| 4,769,996 A | 9/1988 | Barbeau ....................... 60/745 |
| 4,845,941 A | 7/1989 | Paul ............................. 60/776 |
| 4,870,825 A * | 10/1989 | Chapman ..................... 60/745 |
| 5,003,766 A | 4/1991 | Paul ......................... 60/39.15 |
| 5,125,793 A | 6/1992 | MacArthur et al. ......... 415/114 |
| 5,224,713 A | 7/1993 | Pope .......................... 277/415 |
| 5,299,418 A | 4/1994 | Kerrebrock .................. 60/806 |
| 5,313,790 A | 5/1994 | Barr ............................. 60/267 |
| 5,323,602 A | 6/1994 | Defever ....................... 60/804 |
| 5,337,553 A | 8/1994 | Barr ............................. 60/780 |
| 5,695,319 A | 12/1997 | Matsumoto et al. .......... 416/95 |

(Continued)

*Primary Examiner*—Ehud Gartenberg
(74) *Attorney, Agent, or Firm*—Raggio & Dinnin, P.C.

(57) ABSTRACT

Fuel supplied to a rotary fluid trap is centrifugally accelerated within a first cavity adjacent a first side of a rotor, and is then directed though a plurality of first passages extending through the rotor between and proximate to the blades, and shaped so as to at least partially conform to the shape of the blades. Second passages extend within the blades from the first passages and terminate within associated cavities proximate to the tips of the blades. Relatively cooler fuel in the first passages is thermosiphon exchanged for relatively hotter fuel in the second passages so as to cool the blades. The heated fuel flows into a second cavity adjacent to a second side of the rotor and is discharged from the rotating frame of reference directly into the combustion chamber through a second rotary fluid trap. A separate fuel distribution circuit is used for starting and warm-up.

28 Claims, 5 Drawing Sheets

U.S. PATENT DOCUMENTS

| | | | |
|---|---|---|---|
| 5,857,836 A | 1/1999 | Stickler et al. | 416/96 R |
| 6,094,905 A | 8/2000 | Fukuyama | 60/806 |
| 6,192,670 B1 | 2/2001 | Kerrebrock | 60/806 |
| 6,195,979 B1 | 3/2001 | Fukuyama | 60/806 |
| 6,205,770 B1 | 3/2001 | Williams et al. | 60/204 |
| 6,220,016 B1 | 4/2001 | Defever et al. | 60/267 |
| 6,269,647 B1 | 8/2001 | Thompson et al. | 60/748 |
| 6,351,938 B1 | 3/2002 | Kerrebrock | 60/806 |
| 6,357,217 B1 * | 3/2002 | Griffin | 60/780 |
| 6,381,945 B2 | 5/2002 | Werner | 60/782 |
| 6,672,075 B1 | 1/2004 | Sandu et al. | 60/806 |
| 2005/0039463 A1 * | 2/2005 | Condevaux et al. | 60/776 |

* cited by examiner

GAS TURBINE ENGINE COOLING SYSTEM AND METHOD

CROSS REFERENCE TO RELATED APPLICATIONS

Commonly assigned U.S. application Ser. No. 10/249,967 filed on May 22, 2003 discloses a rotary injector that can be used to inject fuel into a gas turbine engine.

DETAILED DESCRIPTION

Figure 1:
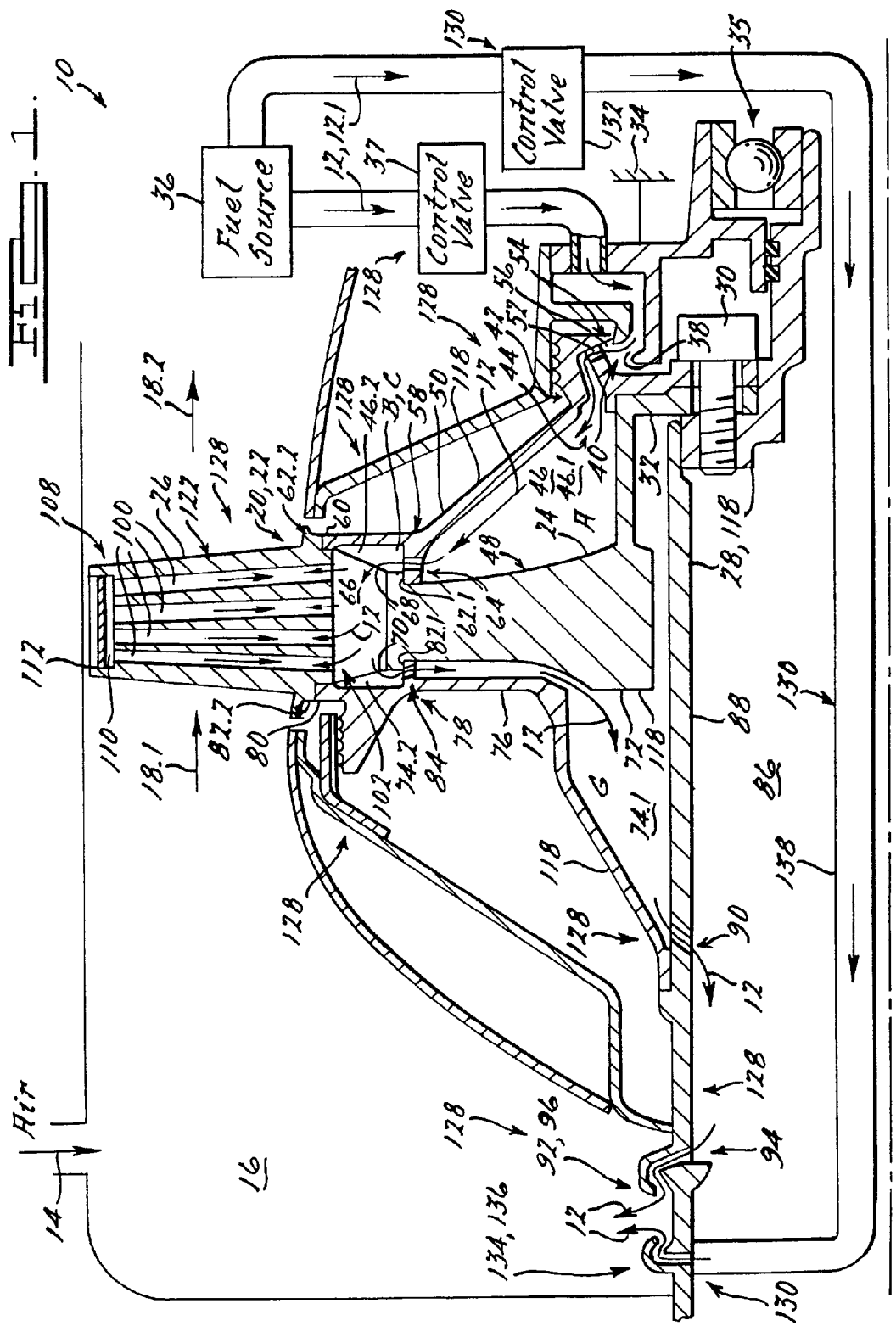
FIG. 1 illustrates a cross-sectional view of gas turbine engine incorporating a system for cooling the turbine rotor and the associated blades thereof.

Referring to FIG. 1, in a gas turbine engine 10, fuel 12 and air 14 are combusted in a combustion chamber 16 so as to generate relatively hot, relatively high pressure exhaust gases 18.1 which are directed through a turbine 20 comprising a bladed rotor 22, e.g. a rotor 24 incorporating a plurality of blades 26 on the periphery thereof. The turbine 20 is operatively coupled to a shaft assembly 28, e.g. with a bolt 30 through an associated flange 32, and the shaft assembly 28 is supported from the housing 34 of the gas turbine engine 10 by one or more bearings 35 that provide for rotation of the shaft assembly 28 and turbine 20 relative thereto. The action of the exhaust gases 18.1 against the blades 26 rotates the turbine 20 and the shaft assembly 28, which, for example, is operatively coupled to a compressor (not illustrated) that provides for pumping the air 14 into the combustion chamber 16. The exhaust gases 18.2 discharged from the turbine 20 are at a relatively lower pressure than the exhaust gases 18.1 upstream thereof as a result of the work done by the exhaust gases 18.1 on the turbine 20.

Under some conditions, for example, when operated as a turbo-jet engine to propel a high-speed aircraft at high Mach numbers, the air 14 supplied to the gas turbine engine 10 is relatively hot, which contributes to increased temperature of the exhaust gases 18.1, and which is not sufficiently cool to otherwise provide for adequately cooling the turbine 20, so that the temperature of the associated blades 26 can become excessive. Under these conditions, the fuel 12 is generally sufficiently cool to provide sufficient cooling capacity to cool the gas turbine engine 10, and particularly, to cool the turbine 20 thereof, which might otherwise be susceptible to thermally induced failure, whereby the gas turbine engine 10 is cooled by directing fuel 12 from a source of fuel 36 through the rotor 24 and blades 26 of the turbine 20 to cool the rotor 24 and the blades 26 of the turbine 20, and then combusting this fuel 12—heated by the cooling process—in the combustion chamber 16.

For example, fuel 12 from a source of fuel 36 comprising a fuel tank and an associated fuel pump is supplied through a first control valve 37 to an orifice 38 that is relatively fixed with respect to the housing 34 of the gas turbine engine 10. The fuel 12 is discharged from the orifice 38 into an inlet 40 of a first rotary fluid trap 42 operatively coupled to the rotor 24 so as to rotate therewith. The outlet 44 of the first rotary fluid trap 42 is in fluid communication with a first portion 46.1 of a first cavity 46 that is bounded by a portion of a first side 48 of the rotor 24 and by a first bounding surface of an aft cover 50 of which the first rotary fluid trap 42 is a part.

The first rotary fluid trap 42 comprises a passage 52 that provides for fluid communication between the inlet 40 and the outlet 44, wherein, in accordance with the teachings of U.S. Pat. Nos. 4,870,825 and 6,269,647, and of U.S. application Ser. No. 10/249,967, each of which is incorporated herein by reference, the passage 52 is adapted so the when the first rotary fluid trap 42 is rotated, a centrifugal acceleration at any point within the passage 52 is greater than a centrifugal acceleration at any point on either the inlet 40 or the outlet 44. Accordingly, when the rotating passage 52 is filled with a relatively high density medium, such as liquid fuel 12.1, the radial levels of the inlet 40 and outlet 44 will be equal when there is no pressure differential therebetween, and will be otherwise unequal by an amount dependent upon the magnitude of the pressure differential and the speed of rotation. For a relatively low pressure supply of liquid fuel 12.1 to an inlet 40 of a passage 52 feeding a relatively high pressure region at the outlet 44, the passage 52 can prevent backflow therethrough. Accordingly, the first rotary fluid trap 42 provides for isolating the pressure in the first cavity 46—which can be relatively high—from the pressure at the inlet 40 of the passage 52—which is relatively lower—thereby providing for supplying fuel 12 to the inlet 40 of the first rotary fluid trap 42 across a rotary junction 54 between the rotating inlet 40 and the relatively fixed orifice 38, whereby liquid fuel 12.1 sprayed from the relatively fixed orifice 38 becomes captured by an internal trough 56 associated with the inlet 40 of the first rotary fluid trap 42 as a result of centrifugal acceleration acting upon the liquid fuel 12.1 upon striking the internal trough 56 and rotating therewith.

Figure 2:
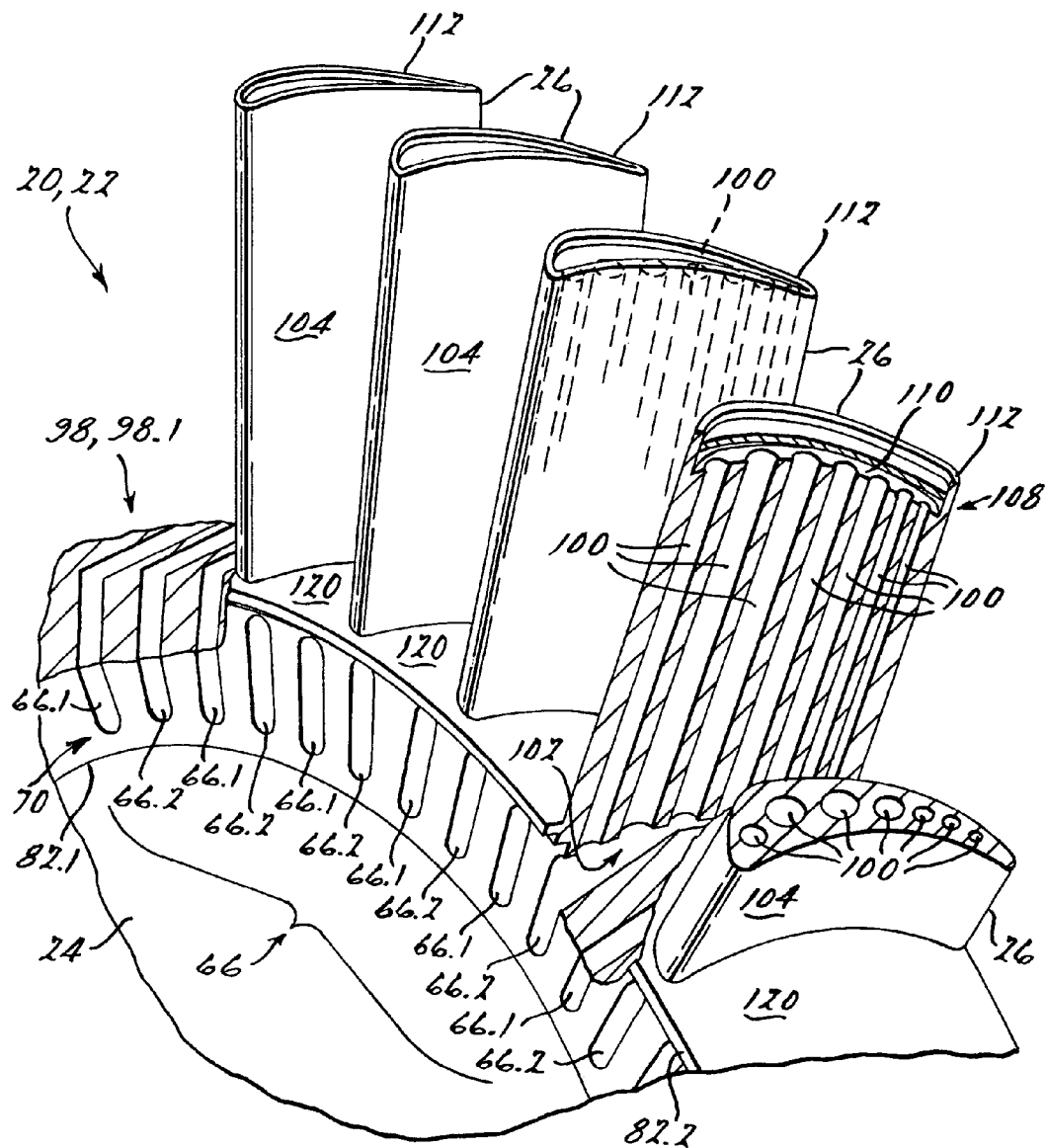
FIG. 2 illustrates a isometric view of a portion of a bladed rotor and associated fragmentary sectional views thereof.

The aft cover 50 comprises an intermediate rim 58 and an outer rim 60 that engage respective first 62.1 and second 62.2 lips formed on the first side 48 of the rotor 24. The outer rim 60 is sealed to the second lip 62.2 so as to prevent leakage of fuel 12 from the joint therebetween. The intermediate rim 58 incorporates at least one passage 64 that provides for fluid communication between first 46.1 and second 46.2 portions of the first cavity 46. The second portion 46.2 of the first cavity 46 is in fluid communication with a plurality of first passages 66 that extend through the rotor 24. Referring also to FIG. 2, each first passage 66 has a first opening 68 on the first side 48 of the rotor 24, and a second opening 70 on a second side 72 of the rotor 24, the first 48 and second 72 sides being opposite to one another.

The first passages 66 are in fluid communication with a second portion 74.2 of a second cavity 74 that is bounded by a portion of the second side 72 of the rotor 24 and by a second bounding surface of a forward cover 76, wherein the forward cover 76 comprises an intermediate rim 78 and an outer rim 80 that engage respective first 82.1 and second 82.2 lips formed on the second side 72 of the rotor 24. The outer rim 80 is sealed to the second lip 82.2 so as to prevent leakage of fuel 12 from the joint therebetween. The intermediate rim 78 incorporates at least one passage 84 that provides for fluid communication between the second portion 74.2 of the second cavity 74 and a first portion 74.1 thereof. The first portion 74.1 of the second cavity 74 is in fluid communication with the interior 86 of a shaft 88 of the shaft assembly 28 via at least one passage 90 through the shaft 88, and the interior 86 of the shaft 88 is in fluid communication with a first discharge orifice 92 through at least one other passage 94 through the shaft 88. The first discharge orifice 92 is in fluid communication with the combustion chamber 16, and thereby provides for a discharge of fuel 12 directly from the rotating shaft 88 to the combustion chamber 16. The first discharge orifice 92 is, for example, a part of a second rotary fluid trap 96 that provides for isolating the relatively high pressure of the combustion chamber 16 from the relatively lower pressure of the interior of the shaft 88 and the first portion 74.1 of the second cavity 74, whereby the principles of structure and operation of the second rotary fluid trap 96 are the same as those of the first rotary fluid trap 42 described hereinabove.

Figure 5:
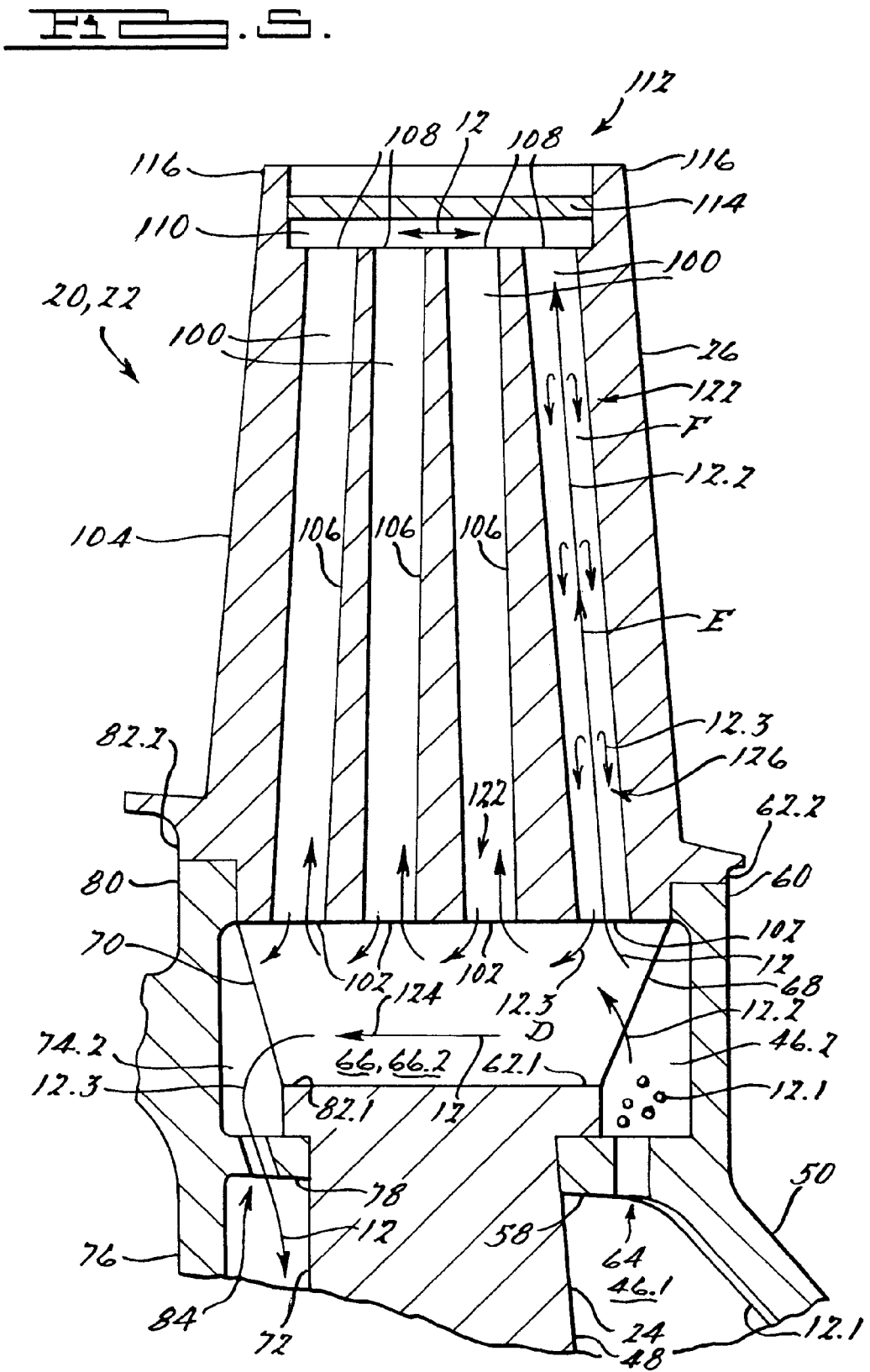
FIG. 5 illustrates a cross-sectional view of a portion of a bladed rotor and an associated thermosiphon process therein.

Referring to FIGS. 2 and 5, the first passages 66 and associated first 68 and second 70 openings are substantially uniform in size and shape, and uniformly distributed so as to provide a mechanically balanced rotor 24. The axial shape 98 of the first passages 66 is adapted to at least partially conform to a profile of the associated blades 26. For example, in the embodiment illustrated in FIG. 2, the first passages 66 have chevron axial shape 98.1 so as to at least partially conform to the camber of the blades 26. A first set 66.1 of first passages 66 extend through the rotor 24 at associated circumferential locations that are substantially between the associated circumferential locations of the associated blades 26, and a second set 66.2 of first passages 66 extend through the rotor 24 at associated circumferential locations that are substantially aligned with the associated circumferential locations of the associated blades 26, whereby the first 66.1 and second 66.2 sets of first passages 66 are interleaved with respect to one another. Each of the blades 26 incorporates a plurality of second passages 100 that extend substantially radially therewithin, each of which at a first end 102 thereof intersects an associated first passage 66 of the second set 66.2 that is aligned therewith. For example, the second passages 100 are substantially linear along the length thereof. As illustrated in FIG. 2, the diameter of the second passages 100 within a particular blade 26 can be adapted in accordance with the associated blade thickness proximate thereto, so as to provide sufficient heat transfer between the outer surface 104 of the blade 26 and the surface 106 of the associated second passage 100 while providing for adequate blade strength. The distal second ends 108 of the second passages 100 are terminated in a third cavity 110 proximate to a tip 112 of the blade 26, wherein the third cavity 110 provides for fluid communication amongst the second passages 100 within the associated blade 26. For example, the third cavity 110 is formed by a end cap 114 that is separated from the second ends 108 of the second passages 100, and which is secured at its periphery to the edge 116 of the blade 26. The blades 26 are closed with respect to the combustion chamber 16 relative to the fuel 12 within the blades 26, so that all of the fuel 12 enters the combustion chamber 12 at a location that is radially inward of the blades 26.

Accordingly, the gas turbine engine 10 comprises a rotatable portion 118 that is rotatable with respect to a housing 34 of the gas turbine engine 10, wherein the rotatable portion 118 comprises the turbine 20/bladed rotor 22, comprising the rotor 24 and the blades 26; the aft cover 50 and associated first rotary fluid trap 42; the forward cover 76; and the shaft assembly 28/shaft 88 and associated first discharge orifice 92/second rotary fluid trap 96, all of which rotate in unison with a rotating frame of reference. After discharge from the relatively fixed orifice 38, the fuel 12 is contained within the rotatable portion 118 until discharge directly into the combustion chamber 16 from the first discharge orifice 92 of the rotatable portion 118 in the rotating frame of reference Accordingly, because all of the elements of the rotatable portion 118 rotate in unison with the rotating frame of reference, these elements can be readily sealed to one another as necessary to contain the fuel 12 therein, for example, at the junctions of the outer rims 60, 80 of the first 50 and second 76 bounding surfaces with the second lips 62.2, 82.2 of the rotor 24, which could otherwise be problematic if it were necessary to provide for sealing across a relatively moving junction of elements to be sealed to one another.

With the gas turbine engine 10 in operation, liquid fuel 12.1 provided by the source of fuel 36 and regulated by the first control valve 37 is discharged from the relatively fixed orifice 38 into the internal trough 56 of the inlet 40 of the first rotary fluid trap 42. The discharged liquid fuel 12.1 is captured by the internal trough 56 as a result of the centrifugal acceleration acting upon the discharged liquid fuel 12.1 which commences rotation with the rotatable portion 118 upon impact with the internal trough 56 or the liquid fuel 12.1 contained therein. Liquid fuel 12.1 entering the inlet 40 of the first rotary fluid trap 42 is pumped through the associated passage 52 of the first rotary fluid trap 42 by the action of centrifugal acceleration forces acting upon the liquid fuel 12.1 contained within the first rotary fluid trap 42, and this action of centrifugal acceleration forces also isolates the relatively low pressure at the inlet 40 of the first rotary fluid trap 42 from a relatively high pressure at the outlet 44 thereof. Upon exiting the outlet 44 of the first rotary fluid trap 42, the fuel 12 is accelerated radially outwards, whereby liquid fuel 12.1—which is relatively dense in comparison with associated fuel vapor—tends to follow the inside of the aft cover 50.

Figure 3:
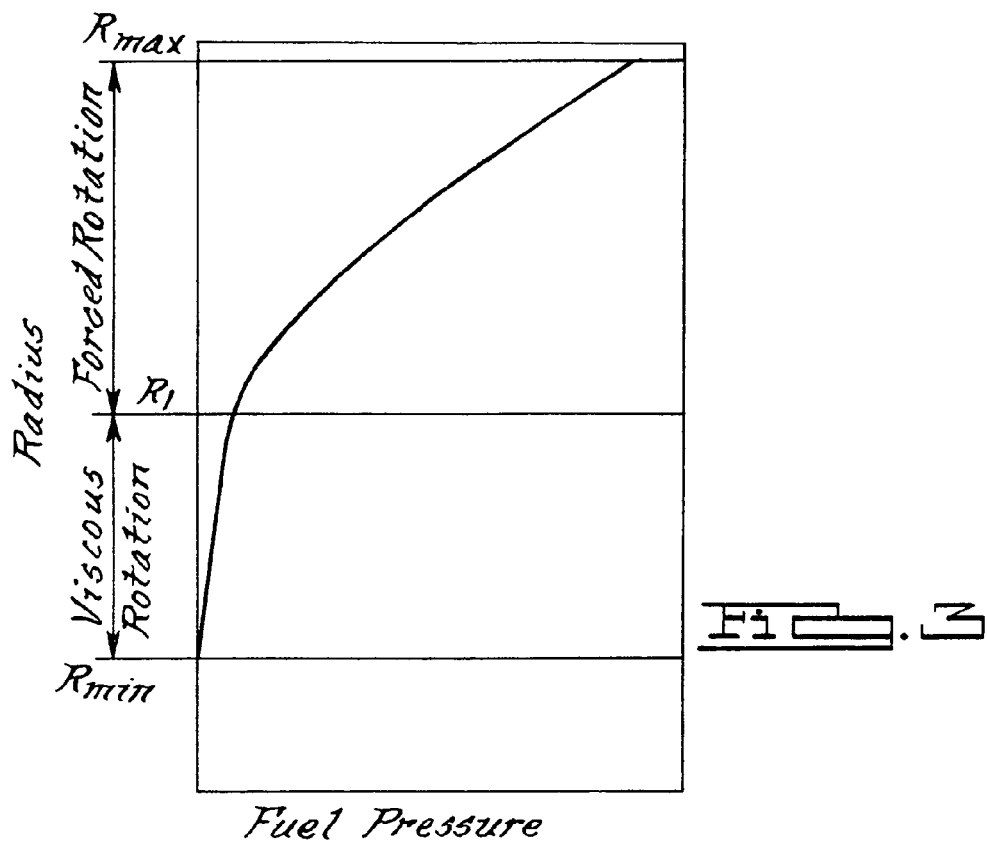
FIG. 3 illustrates a diagram of the relationship between fuel pressure and radial location within the bladed rotor of the gas turbine engine illustrated in FIG. 1.
Figure 4:
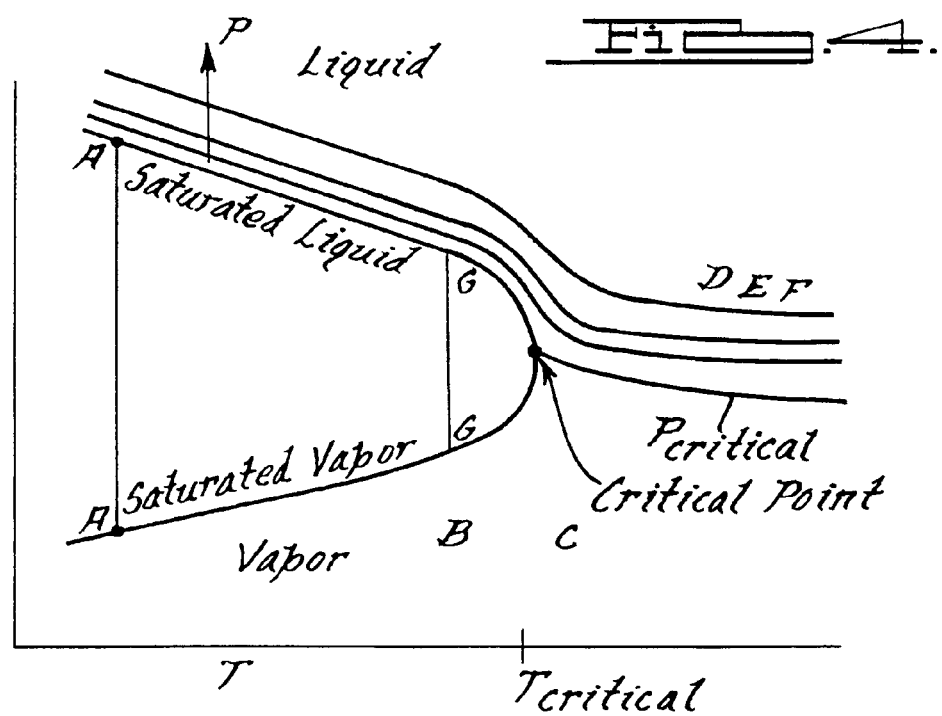
FIG. 4 illustrates a diagram of the density and state of fuel as a function of temperature and pressure.

During normal operation of the gas turbine engine 10, the hottest portion of the turbine 20/bladed rotor 22 are the blades 26 which are directly exposed to the relatively hot exhaust gases 18.1 from the combustion chamber 16. Heat from the blades 26 is transferred to the rotor 24 and associated first 50 and second 76 bounding surfaces, which provides for heating any fuel 12 in the associated first 46 and second 74 cavities that are adjacent to the first 48 and second 72 sides of the rotor 24. Accordingly, the temperature of the rotor 24 and adjacent aft cover 50 increases with decreasing distance from the blades 26, so that fuel 12 within the first cavity 46 is heated as it flows radially outwards. Furthermore, referring to FIG. 3, the centrifugal acceleration acting upon the fuel 12 increases with increasing radial distance within the first cavity 46, which increases the associated pressure thereof. Fuel 12 in the first 46 or second 74 cavities is rotated by viscous forces generated as a result of relative motion of the rotor 24 and aft cover 50 acting with respect to the liquid or vapors in the associated first 46 or second 74 cavities, whereas fuel 12 in the first 66 or second 100 passages is forced to rotate with the rotor 24 and blades 26. Accordingly, as illustrated in FIG. 3, in the former region of viscous rotation, the fuel pressure increases at a lower rate with respect to radial distance than in the latter forced region because of slippage within the flow stream than can occur in the former region but not in the latter. Referring to FIG. 4, as the fuel 12 is heated in the first portion 46.1 of the first cavity 46, the fuel 12 is transformed from a saturated liquid to a saturated vapor, as indicated by the locus of points labeled "A", which is also shown in FIG. 1. As the fuel 12 flows from the first 46.1 to the second portion 46.1 of the first cavity 46, the fuel 12 becomes superheated, and may exhibit a mixture of states as indicated by the points labeled "B" and "C" in FIGS. 1 and 4.

As the fuel 12 flows through the first opening 68 into the first passage 66, it becomes further heated and pressurized. Fuel 12 in the first set 66.1 of first passages 66 flows therethrough, out of the second openings 70 thereof, and then into the second portion 74.2 of the second cavity 74, and in the process, provides for cooling the rim 120 of the rotor 24 in the regions between the blades 26. Referring to FIG. 5, the centrifugal acceleration field causes relatively dense fuel 12 in the second set 66.2 of first passages 66 to flow into the second passages 100 intersecting therewith, which displaces fuel 12 therein that has become relatively more heated and less dense, responsive to a thermosiphon process that is driven by the centrifugal acceleration field and by the decrease in density as fuel 12 becomes heated as a result of heat transfer from the blades 26 which cools the blades 26. The thermosiphon flow 122 within the second passages 100 and between the first 66 and second 100 passages causes a continuous exchange of relatively cooler fuel 12.2 for relatively hotter fuel 12.3, which is also illustrated by the points "D", "E" and "F" in FIGS. 4 and 5. The relatively hotter fuel 12.3 ultimately flows through the second opening 70 of the second set 66.2 of first passages 66 and into the second portion 74.2 of the second cavity. The second set 66.2 of first passages 66 provides for the flow of fuel 12 either directly therethrough from the first opening 68 to the second opening 70 along a first flow path 124, which provides for cooling the rotor 24 at the base of the associated blade 26; or indirectly after first flowing along a second flow path 126 which includes one or more second passages 100 responsive to a thermosiphon process, which provides for cooling the associated blade 26 of the turbine 20.

The relatively less dense heated fuel 12.3 in the second portion 74.1 of the second cavity 74 flows through the passage 84 into the first portion 74.1 of the second cavity 74 after being displaced by relatively more dense less heated fuel 12 from the first passages 66. As the fuel flows radially inwards in the second cavity 74, the pressure thereof is reduced, and the fuel 12 is cooled by exchange of heat with the relatively cooler surroundings, transforming from a superheated vapor to a saturated vapor then a saturated liquid, as indicated by the locus of points labeled "G" on FIG. 4 corresponding to the location similarly labeled in FIG. 1. The fuel 12 then flows through the passage 90 through the shaft 88, through the interior 86 of the shaft 88, out of a second passage through the shaft 88 and into the combustion chamber 16 through the first discharge orifice 92 which is part of a second rotary fluid trap 96.

The above-described system and method of cooling the turbine 20—wherein fuel 12 is delivered by a first fuel distribution circuit 128 from the source of fuel 36 through the first control valve 37 to the rotor 24 and blades 26—is beneficially used when the turbine 20 is at a temperature that is sufficient to vaporize the fuel 12 so as to mitigate against interfering with the mechanical balance of the turbine 20. In accordance with another aspect, it is beneficial to utilize a second fuel distribution circuit 130 that provides for injecting fuel directly into the combustion chamber 16 without involving flow through the rotor 24 and blades 26. Referring to FIG. 1, liquid fuel 12.1 supplied from the source of fuel 36 is regulated by a second control valve 132 and delivered to a second discharge orifice 134, for example, a part of a third rotary fluid trap 136, for example, operatively coupled to the shaft 88, wherein fuel 12 is supplied from the second control valve 132 through a separate passage 138 in the interior of the shaft 88. For example, the first 37 and second 130 control valves would be controlled so that all of the fuel 12 to the gas turbine engine 10 is delivered by the second fuel distribution circuit 130 during startup and warm-up conditions. After the gas turbine engine 10 has warmed up, in one embodiment, the second fuel distribution circuit 130 provides for a sufficient amount of fuel 12 to maintain an idle operating condition, and the remaining fuel 12 is provided by the first control valve 38 via the first fuel distribution circuit 128 responsive to operationally dependent demand. In another embodiment, all of the fuel 12 might be delivered by the first fuel distribution circuit 128 after the gas turbine engine 10 has warmed up. In yet another embodiment, some other relative distribution of fuel 12 between the first 128 and second 130 fuel distribution circuits is used.

Figure 6:
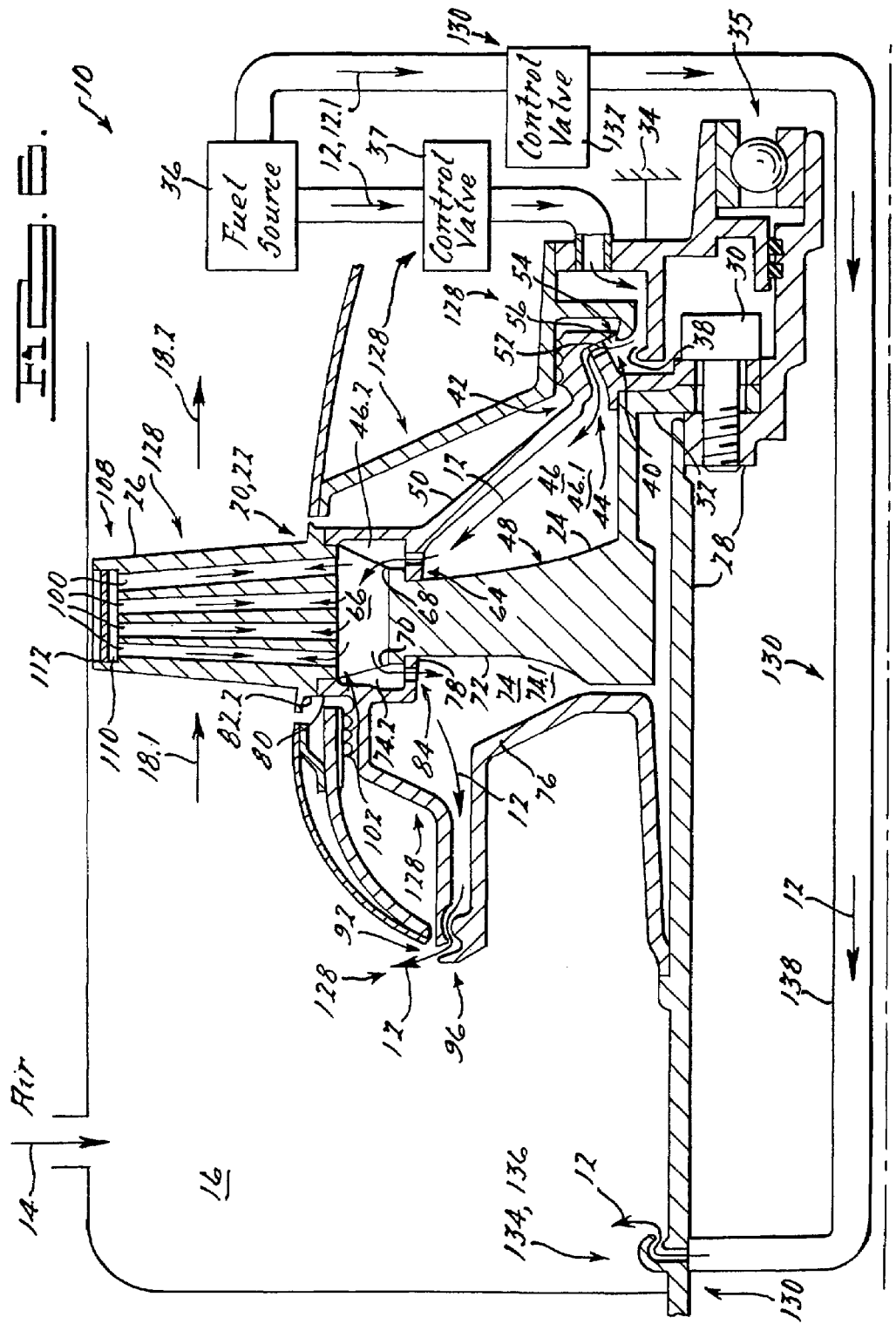
FIG. 6 illustrates a cross-sectional view of gas turbine engine incorporating another embodiment of a system for cooling the turbine rotor and the associated blades thereof.

Referring to FIG. 6, in accordance with another embodiment, the first discharge orifice 92 and associated second rotary fluid trap 96 are incorporated in the forward cover 76, so as to provide for injection of fuel 12 directly into the combustion chamber 16 therefrom, without involving the shaft 88 as an associated flow path.

In addition to providing for cooling the blades 26 and rotor 24 of the turbine 20, the first fuel distribution circuit 128 also provides for a regenerative recovery of heat from the exhaust 18.1 so as to provide for improved operating efficiency, particularly for stationary applications.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A method of providing for cooling a gas turbine engine, comprising:
   a. providing for supplying fuel to a rotatable portion of the gas turbine engine, wherein said rotatable portion comprises a rotor and at least one blade operatively coupled to or a part of said rotor;
   b. providing for cooling at least one of said rotor and at least one said blade with said fuel supplied to said rotatable portion, wherein said at least one said blade is closed at its tip and lateral surfaces with respect to a combustion chamber of the gas turbine engine relative to said fuel supplied to said at least one said blade; and
   c. providing for discharging said fuel from said rotatable portion directly into a combustion chamber of the gas turbine engine.

2. A method of providing for cooling a gas turbine engine as recited in claim 1, wherein said rotatable portion comprises a rotary fluid trap, said fuel is supplied to an inlet of said rotary fluid trap, and an outlet of said rotary fluid trap is in fluid communication with said rotor.

3. A method of providing for cooling a gas turbine engine as recited in claim 1, wherein the operation of providing for cooling comprises providing for flowing said fuel along at least one first flow path between a first side of said rotor and a second side of said rotor.

4. A method of providing for cooling a gas turbine engine as recited in claim 3, wherein the operation of providing for cooling further comprises providing for thermosiphon exchange of fuel between said at least on first flow path and at least one second flow path, wherein said at least one second flow path extends within said at least one said blade so as to provide for a transfer of heat from said at least one said blade to said fuel, whereby said thermosiphon exchange is responsive to a centrifugal acceleration field generated by a rotation of said rotatable portion, and said thermosiphon exchange is further responsive to a variation in density of said fuel responsive to the temperature thereof.

5. A method of providing for cooling a gas turbine engine as recited in claim 4, wherein a shape of said at least one first flow path is adapted to at least partially conform to a profile of said at least one said blade, said at least one second flow path is substantially linear in direction, and said shape of said at least one first flow path provides for an intersection of said at least one second flow path with said at least one first flow path.

6. A method of providing for cooling a gas turbine engine as recited in claim 4, wherein the operation of providing for cooling further comprises:
 a. providing for a plurality of said second flow paths within at least one said blade, and
 b. providing for said plurality of said second flow paths to communicate with one another proximate to a second end of said second flow paths that is distal to first end that is in communication with said at least one first flow path.

7. A method of providing for cooling a gas turbine engine as recited in claim 3, wherein the operation of discharging said fuel comprises flowing said fuel out of said second side of said rotor from said first flow path to a discharge location that is radially inward of said first flow path.

8. A method of providing for cooling a gas turbine engine as recited in claim 4, wherein the operation of discharging said fuel comprises flowing said fuel out of said second side of said rotor from said first flow path to a discharge location that is radially inward of said first flow path.

9. A method of providing for cooling a gas turbine engine as recited in claim 1, wherein said fuel is discharged into said combustion chamber from a rotary injector operatively coupled to a shaft portion of said rotatable portion.

10. A method of providing for cooling a gas turbine engine as recited in claim 1, wherein said fuel is discharged into said combustion chamber from a rotary injector operatively coupled to a cavity adjacent to said rotor, and said cavity receives said fuel from said rotor that has been heated as a result of the operation of cooling.

11. A method of operating a gas turbine engine, comprising
 a. rotating a rotor of the gas turbine engine;
 b. supplying at least a first portion of fuel to a first cavity on a first side of said rotor of the gas turbine engine, wherein said first cavity rotates with said rotor;
 c. causing said fuel supplied to said first cavity to rotate with said first cavity, whereby the rotation of said fuel generates a centrifugal acceleration that acts upon said fuel in said first cavity;
 d. flowing said fuel into a first flow path through a first opening on a first side of said rotor;
 e. flowing said fuel from said first flow path into a second flow path, wherein said second flow path extends into a blade operatively coupled to or a part of said rotor, and the operations of flowing said fuel into said first flow path and from said first flow path into said second flow path are responsive to said centrifugal acceleration;
 f. transferring heat from said blade to said fluid in either said first flow path or said second flow path so as to generate a relatively heated fluid therein;
 g. flowing said relatively heated fluid from said second flow path to said first flow path by a thermosiphon process whereby said relatively heated fluid is replaced with a relatively less heated fluid;
 h. flowing said relatively heated fluid from said first flow path through a second opening on a second side of said rotor to a second cavity on said second side of said rotor;
 i. flowing said relatively heated fluid from said second cavity to a rotating orifice operatively associated with a combustion chamber of said gas turbine engine; and
 j. discharging said heated fluid from said orifice into said combustion chamber;
 e. wherein said blade's tip and lateral surfaces are closed surfaces.

12. A method of operating a gas turbine engine as recited in claim 11, wherein the operation of supplying fuel to said first cavity comprises:
 a. discharging said fuel from a first orifice to an inlet of a first rotary fluid trap; and
 b. discharging said fuel from an outlet of said first rotary fluid trap into said first cavity, wherein said first rotary fluid trap is adapted to rotate with said rotor; and said first rotary fluid trap provides for isolating a pressure at said inlet from a pressure at said outlet.

13. A method of operating a gas turbine engine as recited in claim 11, wherein said first and second flow paths are adapted so that said relatively heated fluid is in a supercritical condition.

14. A method of operating a gas turbine engine as recited in claim 11, wherein the operation of discharging said heated fluid comprises discharging said heated fluid through a second rotary fluid trap, and said second rotary fluid trap provides for isolating a pressure of said heated fluid from a pressure of said combustion chamber.

15. A method of operating a gas turbine engine as recited in claim 11, further comprising supplying a second portion of said fuel to said combustion chamber over a separate flow path.

16. A method of operating a gas turbine engine as recited in claim 15, further comprising controlling said first portion of said fuel so as to inhibit a flow of said first portion of said fuel when said turbine engine is not sufficiently hot to cause a vaporization of said fuel within said first flow path.

17. A method of operating a gas turbine engine as recited in claim 15, wherein said second portion of said fuel is adapted to be sufficient to maintain at least an idle operating condition of the gas turbine engine, and said first portion of said fuel is adapted to provide a remainder of said fuel to the gas turbine engine.

18. A gas turbine engine, comprising:
 a. a rotor;
 b. a first cavity on a first side of said rotor, wherein said first cavity is adapted to receive fuel from a source of fuel, and said first cavity is formed between said first side of said rotor and a first bounding surface;
 c. a second cavity on a second side of said rotor, wherein said second cavity is formed between said second side of said rotor and a second bounding surface; and said first and second bounding surfaces are adapted to rotate with said rotor;

d. at least one passage in fluid communication with both said first cavity and said second cavity, wherein said at least one passage extends into at least one blade operatively coupled to or a part of said rotor so as to provide for heat transfer from said at least one blade to said fuel in said at least one passage; and e. at least one first discharge orifice in fluid communication with said second cavity, wherein said at least one first discharge orifice is adapted to rotate with said rotor, said first discharge orifice is adapted to discharge fuel directly into said combustion chamber; and fuel discharged from said first discharge orifice is supplied to said first discharge orifice from said second cavity;

f. wherein said at least one blade's tip and lateral surfaces are closed surfaces.

19. A gas turbine engine as recited in claim 18, further comprising a first rotary fluid trap operatively coupled to said first cavity, wherein said first rotary fluid trap is adapted to receive fuel from said source of fuel and said first cavity is adapted to receive fuel from said first rotary fluid trap.

20. A gas turbine engine as recited in claim 18, further comprising at least one relatively fixed orifice proximate to and separated from an inlet of said first rotary fluid trap, wherein said fuel from said source of fuel is discharged from said at least one relatively fixed orifice and captured by said inlet of said first rotary fluid trap when said first rotary fluid trap is rotated during operation of the gas turbine engine.

21. A gas turbine engine as recited in claim 18, wherein said first bounding surface is sealed to said rotor along a first periphery that surrounds every opening of said at least one first passage on said first side of said rotor; and said second bounding surface is sealed to said rotor along a second periphery that surrounds every opening of said at least one first passage on said second side of said rotor.

22. A gas turbine engine as recited in claim 18, wherein said at least one passage comprises:

a. at least one first passage extending between said first cavity and said second cavity; and b. at least one second passage extending from said first passage into at least one blade operatively coupled to or a part of said rotor.

23. A gas turbine engine as recited in claim 22, wherein a shape of said at least one first passage is adapted to at least partially conform to a profile of said at least one said blade, and said at least one second passage is substantially linear and said at least one second passage is adapted to intersect said at least one first passage.

24. A gas turbine engine as recited in claim 23, wherein said at least one second passage comprises a plurality of second passages within at least one said blade, said at least one said blade comprises a third cavity in fluid communication with said plurality of said second passages at second ends thereof, and wherein first ends of said plurality of second passages are operatively coupled to said at least one first passage.

25. A gas turbine engine as recited in claim 24, wherein said third cavity is proximate to a tip of said at least one said blade.

26. A gas turbine engine as recited in claim 18, wherein said at least one first discharge orifice is operatively coupled to or a part of a shaft operatively coupled to said rotor.

27. A gas turbine engine as recited in claim 18, wherein said at least one first discharge orifice is operatively coupled to or a part of said second bounding surface.

28. A gas turbine engine as recited in claim 18, wherein said at least one first discharge orifice is operatively coupled to or a part of a second rotary fluid trap.

* * * * *

UNITED STATES PATENT AND TRADEMARK OFFICE
CERTIFICATE OF CORRECTION

PATENT NO. : 6,988,367 B2
DATED : January 24, 2006
INVENTOR(S) : Robert S. Thompson et al.

It is certified that error appears in the above-identified patent and that said Letters Patent is hereby corrected as shown below:

Column 2,
Line 20, delete "the" after "is adapted so" and insert -- that -- after "is adapted so".

Column 4,
Line 10, insert -- . -- after "reference".

Column 8,
Line 22, delete "e" before "wherein" and insert -- k -- before "wherein".

Signed and Sealed this

Fourth Day of April, 2006

JON W. DUDAS
*Director of the United States Patent and Trademark Office*